United States Patent [19]

Yoshino et al.

[11] Patent Number: 5,685,442

[45] Date of Patent: Nov. 11, 1997

[54] PACKAGE CONTAINERS RACK FRAME

[75] Inventors: Shuji Yoshino; Seiji Hirano; Yukio Shimizu, all of Shizuoka, Japan

[73] Assignee: Yazaki Industrial Chemical Co., Ltd., Shizuoka, Japan

[21] Appl. No.: 426,737

[22] Filed: Apr. 21, 1995

[51] Int. Cl.6 .................................................. A47F 5/00
[52] U.S. Cl. ................................. 211/201; 211/126
[58] Field of Search .............................. 211/201, 126, 211/41; 248/129

[56] References Cited

U.S. PATENT DOCUMENTS

| | | | |
|---|---|---|---|
| 701,000 | 5/1902 | Ahrens | 211/134 X |
| 751,466 | 2/1904 | Colling | 211/134 X |
| 2,936,899 | 5/1960 | Tashman | 211/133 X |
| 3,240,505 | 3/1966 | Schlemitzaver | 211/201 X |
| 3,610,429 | 10/1971 | Mackay | 211/133 |
| 3,868,123 | 2/1975 | Berg et al. | 211/194 X |
| 4,349,213 | 9/1982 | Hirsch | 211/189 X |
| 4,588,096 | 5/1986 | Story et al. | 211/126 |
| 4,620,637 | 11/1986 | Karashima | 211/188 |
| 4,793,497 | 12/1988 | Hall et al. | 211/133 X |
| 4,795,041 | 1/1989 | Remmers | 211/133 |
| 5,018,323 | 5/1991 | Clausen | 211/189 X |
| 5,125,520 | 6/1992 | Kawasaki | 211/133 |
| 5,131,547 | 7/1992 | Goldberg | 211/201 X |

*Primary Examiner*—Robert W. Gibson, Jr.
*Attorney, Agent, or Firm*—Eric P. Schellin

[57] ABSTRACT

A package containers rack frame for storing, transferring and displaying relative light-weight packages. The rack frame is constructed of a pair of side frames and a plurality of support bases which are removable from the side frames. The support bases are engaged into sockets on the side frame without disassembling of the side frames. The side frames have folding elements that are for controlling the distance between the side frames, which are folding and/or unfolding. The frame members of side frames has an adjusting member for adjusting the distance between the side frames, which thereby permits use of different width or height dimension for the containers. The support base has upward curved projections at both ends thereof for restricting in lateral movement of the containers.

2 Claims, 8 Drawing Sheets

PACKAGE CONTAINERS RACK FRAME

BACKGROUND OF THE INVENTION

1) Field of the Invention

The present invention relates to a rack frame for storing containers or packages. The rack frame is used for transferring and displaying relatively light-weight packages.

2) Description of the Prior Art

Rack frames are known, for example, Japanese Utility Model Bulletin No. 10,583/1977 shows such an apparatus in which the base plates are secured to corner pipes columns by means of hooks which provide at the base plate corners that fit into cooperating slots in the corner pipe columns.

Japanese Utility Model Bulletin No. 35,676/1979 discloses such an apparatus in which a plurality of structural members, columns and beams are assembled by means of different kinds of joints, corners, and T-shapes.

Any construction must be changeable to adapt to different sizes of containers.

On the other hand, the collapse of the rack frame should be accomplished easily and be storable when no containers are employed.

None of the known prior art arrangements are capable of providing such construction features.

SUMMARY OF THE INVENTION

The present invention relates to an improved rack frame for storing, transferring and displaying relatively light-weight packages.

It is therefore a primary object of the present invention to provide support bases that may be collapsed without removing the side frames.

It is another object of the present invention to provide for changing the distance between the side frames to account for different sizes of tray-like holders for containers or packages.

It is another object of the present invention to provide means of the support base having upward curved projections for restricting movement of the stored containers.

It is another object of the present invention to provide wheel casters for smooth movement of the rack frame.

DETAILED DESCRIPTION OF PREFERRED EMBODIMENTS

Preferred embodiments of the rack frame will be described in detail in conjunction with attached drawings.

Figure 1:
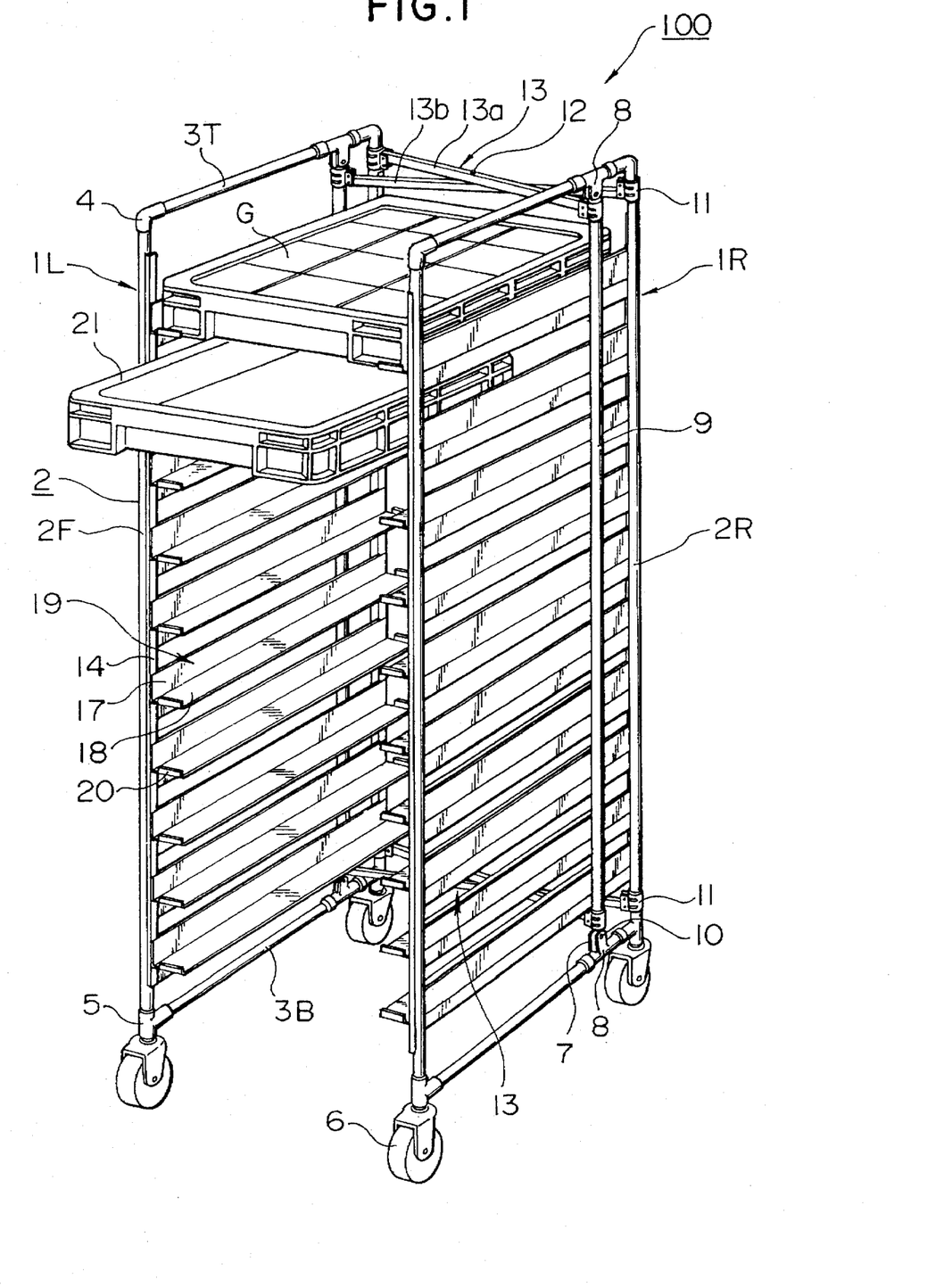
FIG. 1 is a perspective view of the rack frame.
Figure 2:
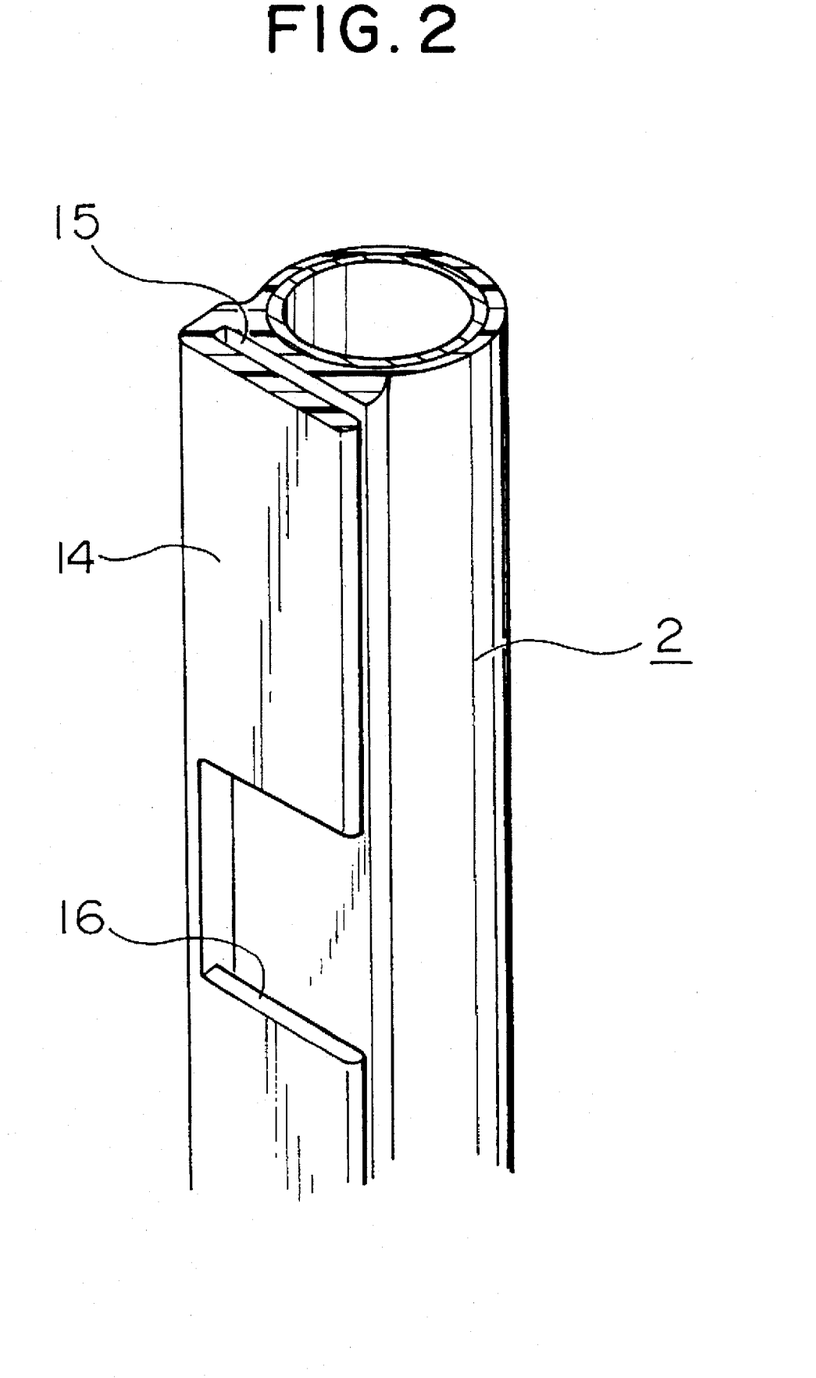
FIG. 2 is a perspective view of a fragment of the column of the rack frame of FIG. 1.
Figure 3A:
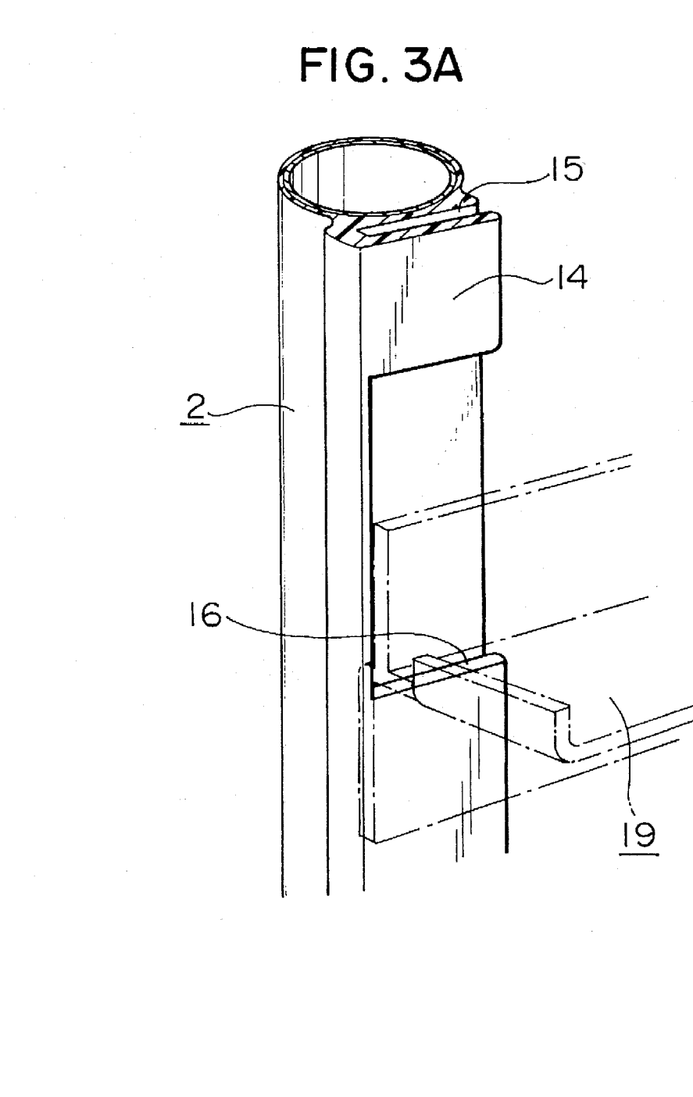
FIG. 3A is a fragmentary perspective view of the column of FIG. 2, as it is engaged to the support base shown in phantom lines of FIG. 3B.
Figure 3B:
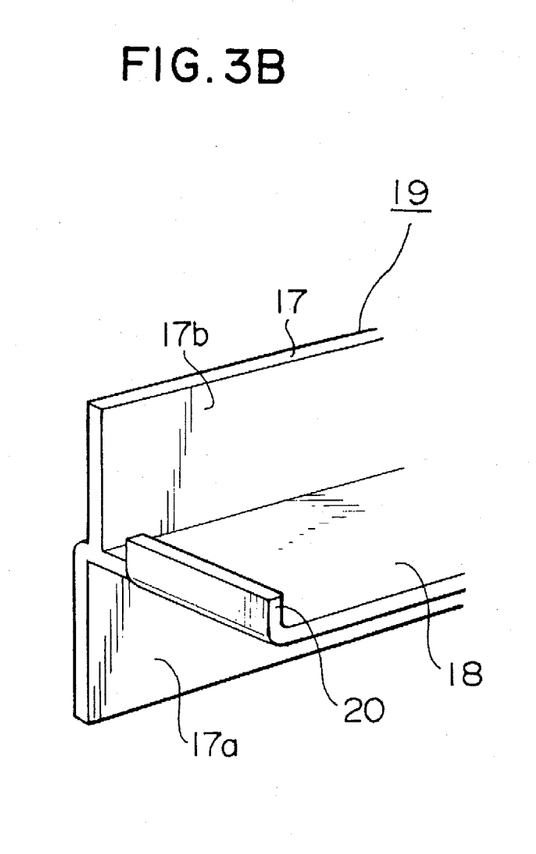
FIG. 3B is a perspective view of the support base of the rack frame of FIG. 1.

Referring now, to FIGS. 1–3, the rack frame 100, generally, consists of a pair of left and right side frame 1L, 1R having a rectangular shape, and a plurality of removable support bases 19 on the left and right side of frame 1L, 1R.

Each side frame 1L, 1R has an upright front columns 2F and rear columns 2R, and top and bottom connecting frame members 3T, 3B at the, respectively, at the top and the bottom of side frame 1L, 1R, and joint members 4, 5 at the top and bottom of the columns 2F, 2R for joining of columns 2F, 2R and the frame member 3T, 3B to depict, generally, either a rectangular, a square or a trapezoid shape.

As best illustrated in FIG. 2, each side frame 1L, 1R may be preferably depicted in a rectangular shape.

The columns 2L, 2R and the frame members 3T, 3B are formed of metal pipe, each of which is approximately 28 to 32 mm in external diameter and constructed of thin-wall steel pipe, which has a round or square shape. The pipe is sheathed in a thin, uniform plastic resin material, such as ASA (Acrylate Styrene Acrylonitrile copolymer) in order to make it light-weight and rust proof. The joint members 4 & 5 are sheathed with the same plastic resin material as the columns 2F, 2R and the frame members 3T 3B.

Casters 6 are mounted to the underside of the each columns 2F, 2R to permits a smooth rolling of the rack frame 100.

In FIG. 1, each of the frame members 3T, 3B has T-shaped movable joints 8 at close to the rear column 2R, which permits a lineal movement on the frame members 3T, 3B.

The movable joint 8 provides a connecting element 7 with a pin 10 for connecting an end of an upright movable column 9.

The movable column 9 is formed of the same sheathed thin-wall steel pipe as in the columns 2F, 2R and the frame members 3T, 3B.

Each of sockets 14 are vertically spaced on the upright front and rear column 2F, 2R of the left and right side frame 1L, 1R, respectively. The sockets are oppositely facing towards one another between the front column 2F and 2F, and its oppositely facing between the rear column 2R and 2R, respectively.

Elongated support base 19, each of which runs the length between left side front and rear column 2F, 2R and cooperates with an opposite support base 19 provided on opposite right side front and rear column 2F, 2R. They project inwardly to both opposite sides of sockets 14, and are engagedly removably in the sockets 14 for receiving trays or containers 21 resulting in a multilayered structure which is detailed to receive a package of goods G.

As shown in FIG. 2, each of the sockets 14 made up of integrally molded sheathed plastics resin on the column 2.

The sockets 14 are molded to provide an upright elongated recess 15 which has a narrow U-shape in cross section, and provide a cut section 16 having a partial surface cut portion along the socket 14, each of recess or channel 15 and cut section 16 is engaged to provide support for base 19.

Each of support bases 19 are constructed of a material generally used in structural members.

It is desirable to use Aluminum alloys, engineering plastics, etc. in order to make the rack light-weight and strong.

As shown in FIG. 3B, each of support bases 19 have a T-shaped cross sectional configuration. Vertical section 17a vertically engages recess or channel 15 and the cut section 16. The bases have a horizontal support section 18 for receiving the containers or trays 21 thereon.

Each of the engaging sections 17 comprises a lower section 17a and an upper section 17b and both engaging section surfaces are slightly off set from each other.

A thickness and width dimension of the lower engaging section 17a has almost the same dimension as the channel or recess 15 whereby it may fit into recess 15. The thickness and width dimension of the upper section 17b and lower section 17a are almost the same in every respective.

Each of the support or shelf section 18 has an upward curved projection 20 at both ends thereof for restricting lateral movement of the containers 21 received thereon.

It will be seen from the preferred embodiment of the rack frame that desired support bases 19 may be removably engaged without disassembling the side frames.

Figure 5:
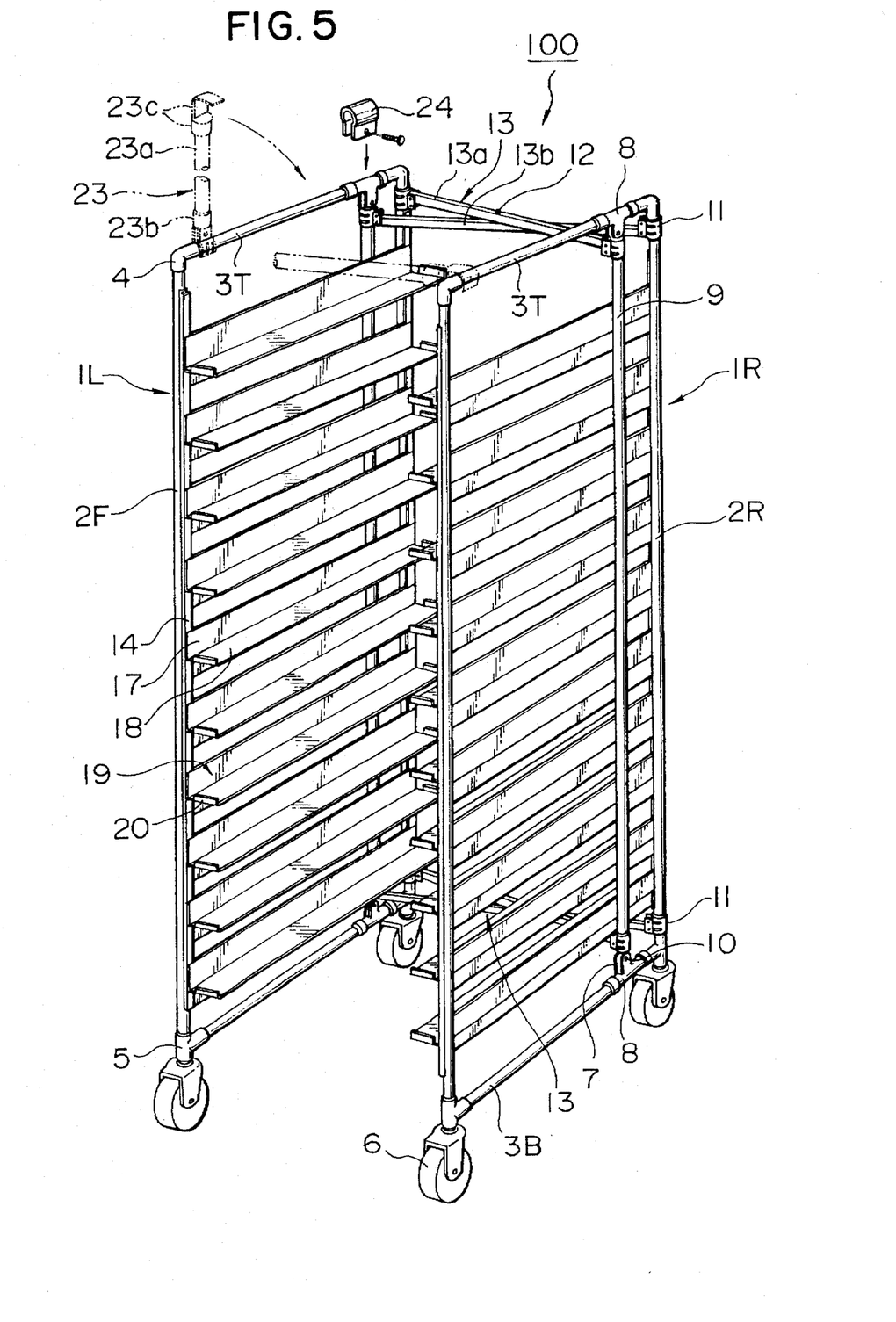
FIG. 5 is a perspective view of another embodiment of the rack frame shown in an expanded condition.

FIGS. 1 and 5, disclose an alternative embodiment of the rack fame. Additionally, folding elements 13, 13 are arranged at the top and bottom of the side frames 1L, 1R, respectively. Each of the folding elements 13, 13 form an X-shape by the crossing of two bar members 13a, 13b extending horizontally which are joined together by means of a center pin 12 at the center portion of respective bar members 13a, 13b.

Both ends of the bar member 13a are pivotally joined to the rear columns 2R and 2L. Each of the movable columns 9 connect with respective hinged joints 11, 11 to column 2R and 2B. Opposite ends of the bar member 13b are pivotally joined to the movable column 9 and the rear column 2R.

Folding elements 13, 13 made of a material generally used in a structure members.

It is desirable to use Aluminum alloys, engineering plastics, etc, in order to make it light-weight and strong.

The combination of the left and right side frame 1L, 1R are interconnected by transverse folding elements 13, 13. The resultant provides a free-standing structure in the form of rack frame 100.

The longitudinal space between adjacent hinged joint 11, and 11 located at each of side frame 1L, 1R, frame member 3T, 3B lengthwise, of the folding elements 13, 13 may be manually moved apart or closer together. The transverse space between hinged joint 11 and 11 located at a pair of left of side frame 1L, 1R may be cooperatively moved to be closer or further apart.

It will be understood that the folding or unfolding of the rack frame 100 will be allowed by widening or narrowing the space between movable column 9 and rear column 2R.

In one typical rack frame 100 shown in FIGS. 1 and 5, each upright front and rear columns 2L, 2R of the left and right side frame 1L, 1R, provided with folding elements 13, 13 has vertically spaced sockets 14 for engaging with the support base 19. The sockets are detailed to removably receive the containers or trays 21 thereon.

Figure 4:
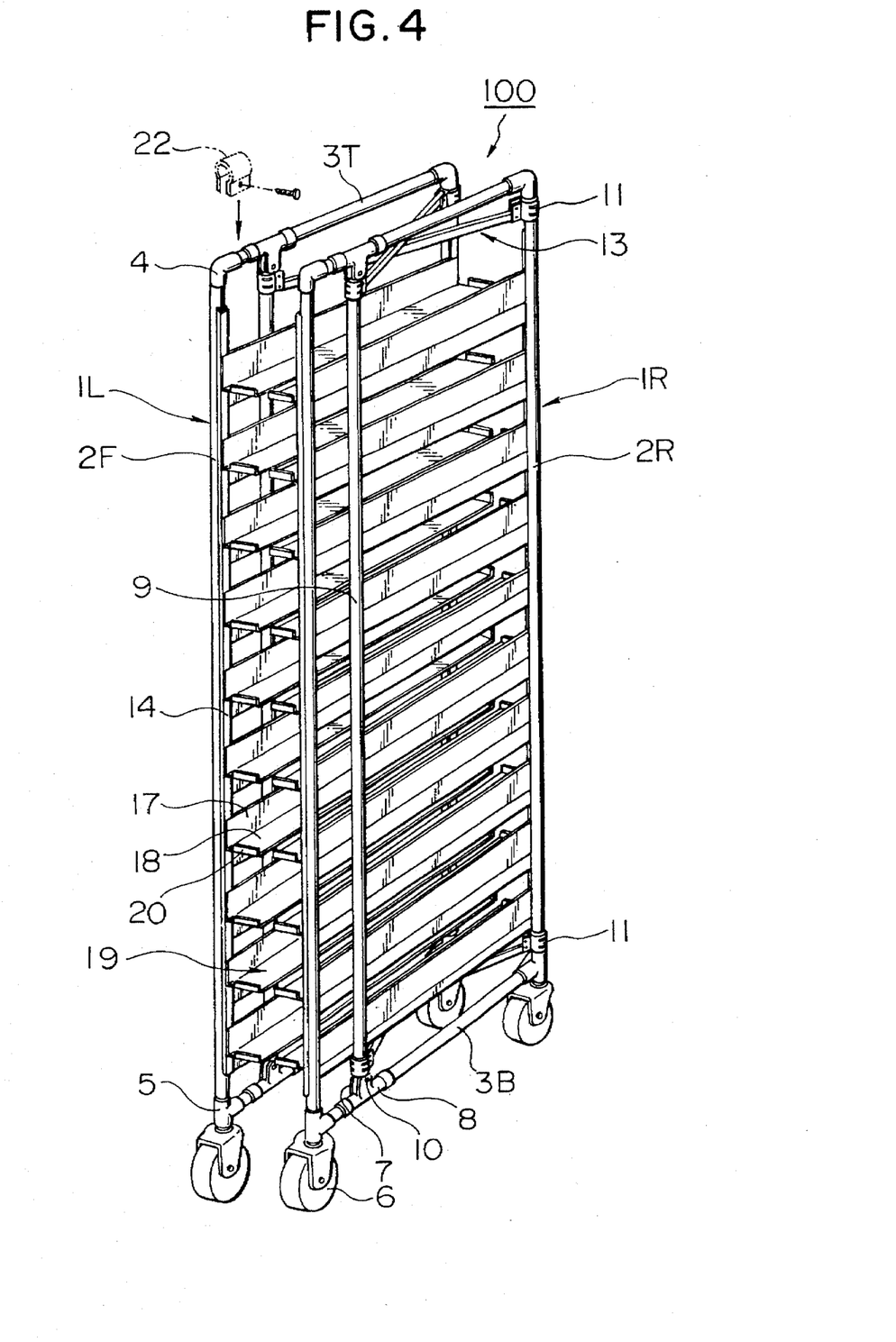
FIG. 4 is a perspective view of the rack frame in a collapsed condition.

As shown in FIG. 4, when the containers or trays 21 are not employed the rack frame 100 may be unimpedingly collapsed.

As the movable column 9 of the side frame 1L, 1R moves manually towards the front column 2F, the movable joints 8 are required for sliding on the frame members 3T, 3B, thereby changing the distance defined between the movable joints 8 and rear column 2R. The folding elements 13, 13 serve as a movement connecting element for folding or collapsing the rack frame 100.

This construction is particularly detailed with the manner in which the movable column 9 with the movable joint 8 are moved to permit sliding of the movable joint 8 on the frame members 3T, 3B without hindrance.

As shown in FIG. 4, each end of the top frame member 3T has a stop member 22, shown by broken lines. The stop member 22 is placed longitudinally at desired locations along the top frame member 3.

Thus, if desired the rack frame 100 is transferred or stored in the case as when it is out of usage, the distance between the left and right side frame 1L, 1R can easily be changed which results in minimizing occupied space by the folding or collapsing of the rack frame 100.

The number of bases 19 may be reduced to thereby permit containers 21 having a larger height.

To disengage the support base 19 from the socket, 14 located at a pair of the left and right side frame 1L, 1R, the lower section 17a of the engage section 17 can be disengaged from the channel or recess 15 of the sockets 14, by manipulation to disengage section 17a so that base 19 is lifted and removed upwardly.

Thus, the support bases 19 are permitted selective removal as required to provide larger vertical space along the height in front and rear columns 2F, 2R of the left and right side frames 1L, 1R.

The number of support bases 19 used depends upon the containers 21 which in turn is dictated by the height of the containers 21.

Casters 6 are mounted in association with each column 2, 2 at the underside of the column. They permit smooth rolling of the rack frame 100.

As showing FIG. 5, an alternative embodiment of the rack frame has significant differences from the embodiment of FIG. 1 previously described.

An adjustable retaining bracket 23 in FIG. 5 is shown at the frame member 3T.

In a preferred form, the adjustable retaining bracket 23 of FIG. 5 as seen in a dotted line in FIG. 5, is constructed so that it is possible readily to change a length thereof and lower end of the adjusting rod 23a is provided with a turnable joint 23b joined to the frame member 3T at a near position to the front column 2F, which is adapted to be permitted a rotatable movement, perpendicular to the direction of the frame member 3T, and upper end of the adjusting rod 23a is provided with a hook 23C that is of a shape as shown which may be fitted to the frame member 3T.

The adjustable retaining bracket 23 is formed of the same plastic sheathed thin-wall steel pipe as in the front and rear columns 2F, 2R and the frame members 3T, 3B.

As shown in FIG. 5, the stop member 24 may be placed longitudinally at a desired location along the top frame member 3T.

The adjustable retaining bracket 23 controls the transverse width between top frame member 3T and 3T. Each left and right side frame 1L, 1R will be properly held rigidly, and be in dimensional relationship with respect to the desired distance between the left and right side frame 1L and 1R, when the rack frame 100 is an open position.

The distance between the left and right side frame 1L and 1R may be changed, thereby permitting receiving different width dimensions of containers or trays 21 to conform with of distance between the left and right side frame 1L and 1R.

It will be recognized that there are other equivalent arrangement of the rack frame 100. For example, as not shown in the drawings, it will be possible to make the left and right side frame 1L, 1R fixed so that the distance between the side frames 1L and 1R cannot be changed narrowly or wider, and a transverse members connected with a joints which are formed of the same plastic sheathed thin-wall steel pipe as in the front and rear column 2F, 2R and the frame members 3T, 3B would be required in order to fix both side frame 1L, 1R, and the applicable joints may be the movable joints 8, for instance.

When the rack frame 100 is not to be moved, it will be possible to eliminate casters 6 from the underside of each column 2F, 2R. The rack frame 100 is then supported fixedly on a ground.

In another embodiment, not shown in the drawings, the folding elements 13, 13 are provided at the top and bottom, or mid-height point or others points of the left and right side frames 1L, 1R, respectively.

Both ends of the bar member 13a are joined to the front column 2F and the movable column 9, using the hinged joint 11, 11, respectively. Alternatively, both ends of the bar member 13B are joined to the movable column 9 and the front column 2F, using the hinged joints 11, 11, respectively.

In another embodiment, as shown in FIG. 4 and 5, the stop member 24 may be placed longitudinally at a desired location along the bottom frame member 3B or the top and bottom frame member 3T, 3B or both side frames 1L, 1R, respectively Referring now to FIGS. 6A, 6B–8A, 8B, an alterative embodiment of the support base 25, 29 and 33 of the invention is illustrated with each of the column 2.

Figure 6A:
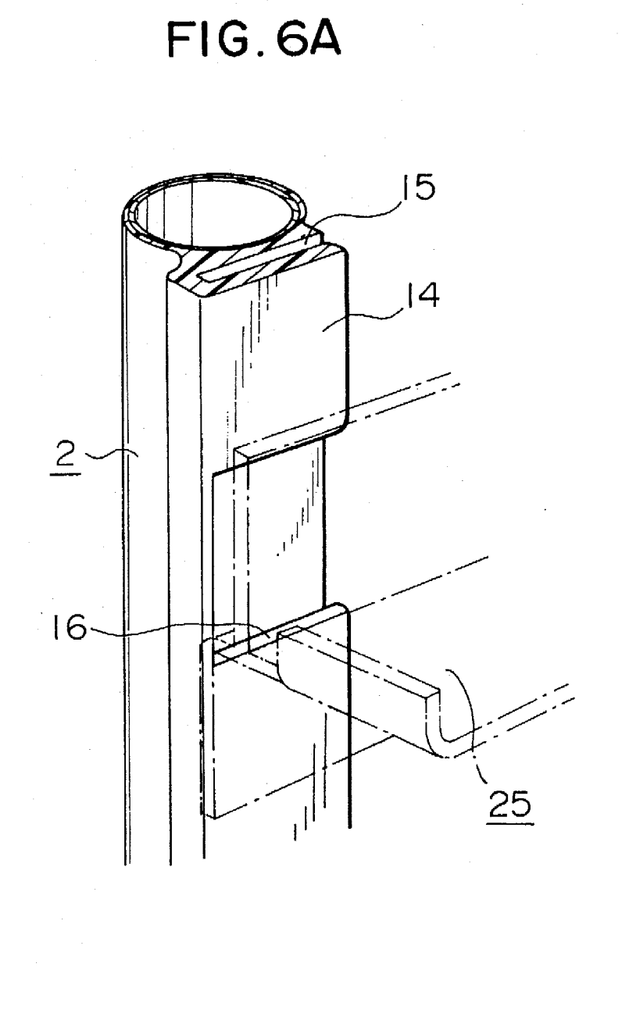
FIG. 6A is a fragmentary perspective view of another embodiment of the column of FIG. 2, as it is engaged to the support base shown by phantom lines of FIG. 6B.
Figure 6B:
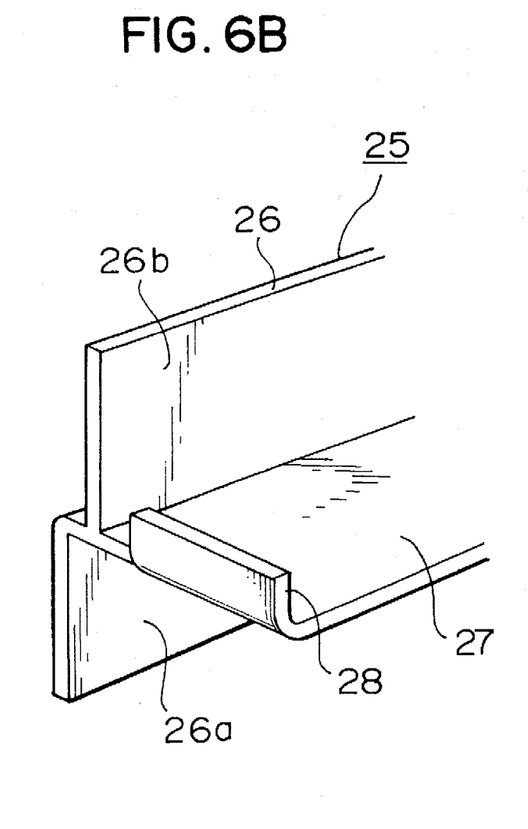
FIG. 6B is a perspective view of another embodiment of the support base of the rack frame of FIG. 1 or FIG. 5.

As shown in FIGS. 6A and 6B, each of the support bases 25 have a T-shaped cross sectional configuration. An engagement section 26 is provided for vertically fitting into channel recess 15 and cut section 16. The base 25 has a support section 27 horizontal for receiving the containers thereon.

Each of the engagement section 26 is provided with a lower section 26a and an upper section 26b. The surfaces of both section 26a and 26b are vertically offset from each other.

Each of the support section 27 has an upward curved projection 28 at both ends thereof for restricting, in lateral movement the containers 21 received thereon.

The sockets 14 are vertically spaced to provide the cut section 16. A height dimension of the cut section 16 and width dimension of the upper section 26b are the same in every respect.

Figure 7A:
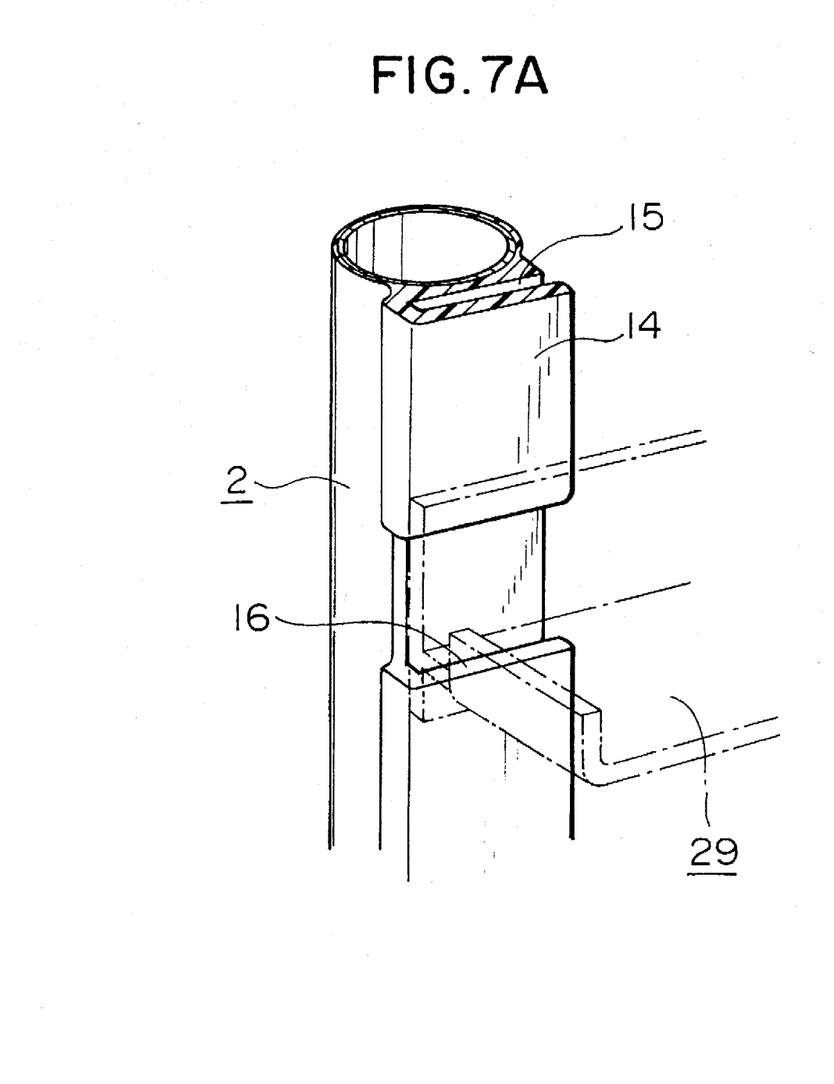
FIG. 7A is a fragmentary perspective view of another embodiment of the column of FIG. 2, as it is engaged to the support base of FIG. 7B.
Figure 7B:
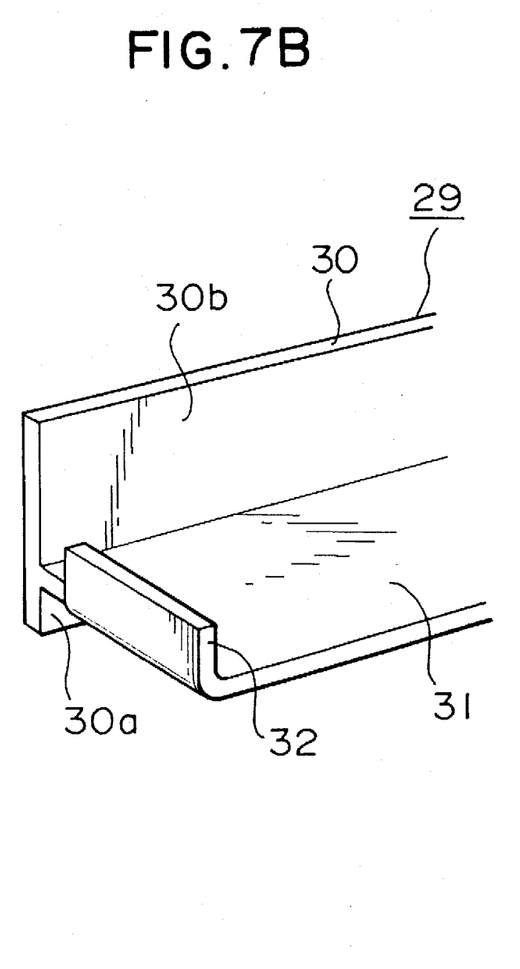
FIG. 7B is a perspective view of another embodiment of the support base of the rack frame of FIG. 1 or FIG. 5.

As shown in FIGS. 7A and 7B, each of the support bases 29 have T-shaped cross sectional configuration, is provide an engagement section 30, for vertically insertion into channel or recess 15 and on the cut section 16. The base or horizontal support section 31 to receive the containers.

Each of the engagement section 30 is provided with a lower section 30b and an upper section 30b, the width dimension of support section 30b is larger than the width dimension of the lower section 30a, integrally formed.

Each of the support section 31 has an upward curved projection 32 as both ends thereof for restricting in lateral movement of the containers 21 held thereon.

The sockets 14 are vertically spaced to provide the cut section 16 thereof, a height dimension of the cut section 16 is smaller than the width dimension of the engagement section 30.

When the support base 29 are engaged to the socket 14 the procedure is as follows:

First, an upper side of the upper section 30b is inserted manually into a lower side of the channel or recess 15 of the socket 14, a position of a lower side of lower section 30a is maintained over an upper side of an upper side of the channel or recess 15 apart.

Next, the lower side of the lower section 30a is downwardly inserted into the upper side of the channel or recess 15 part. Thus, the upper side of the upper section 30b and the lower side of the lower section 30a are engaged in each of the sockets 14. When the support base 29 are disengaged from the socket 14, the procedure is reversed.

Figure 8A:
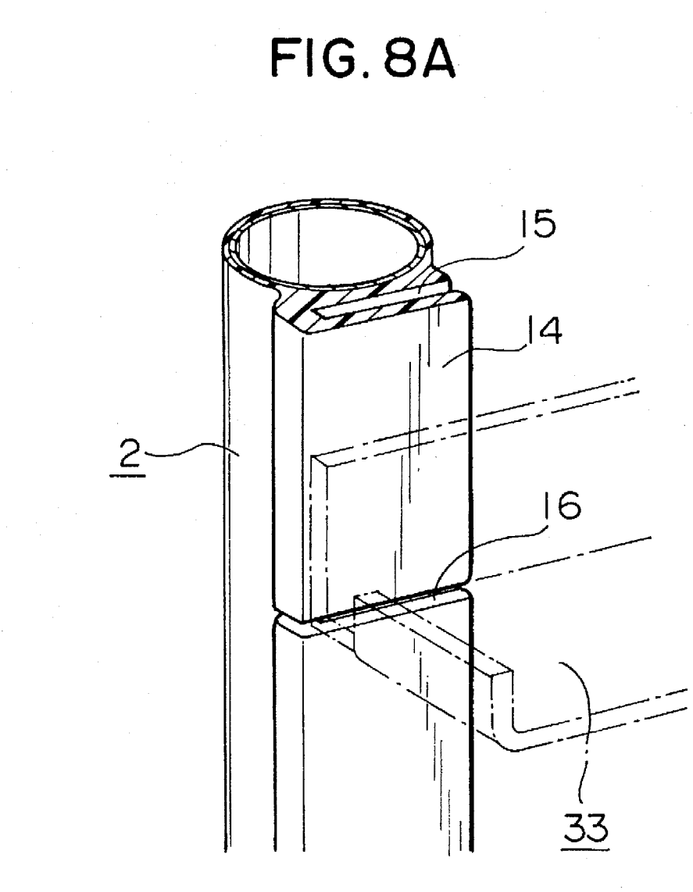
FIG. 8A is a fragmentary perspective view of another embodiment of the column of FIG. 2 as it is engaged to the support base of FIG. 8B.
Figure 8B:
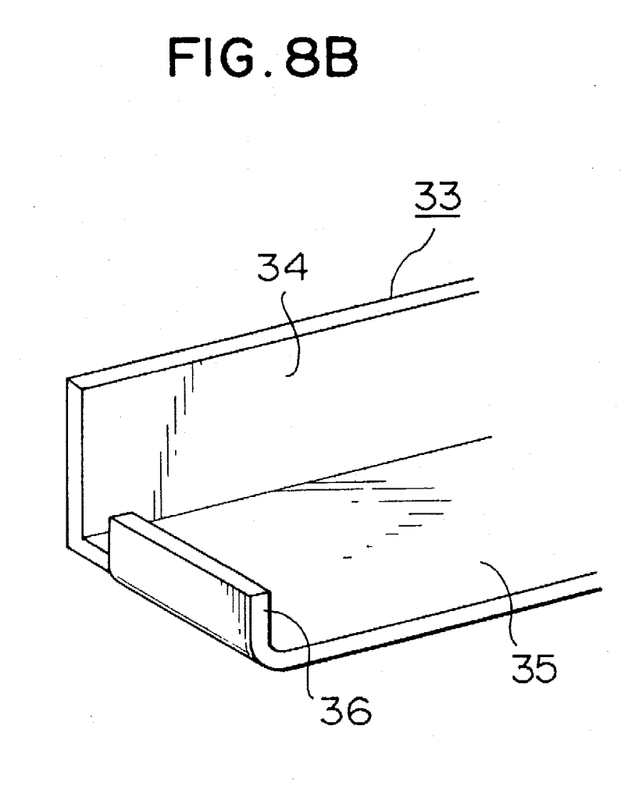
FIG. 8B is a perspective view of another embodiment of the support base of the rack frame of FIG. 1 or FIG. 5.

As shown in FIGS. 8A and 8B, each of the support bases 33 have an L-shaped cross sectional configuration, different from those set forth in FIGS. 3A 3B, 6A, 6B and 7A 7B is provide an engagement section 34 upwardly for engagement into the channel or recess 15 and through the cut section 16. A horizontal support section 35 receives the containers thereon.

Each of the support sections 35 has an upward curved projection 36 at both ends thereof for restricting in lateral movement the containers 21 received thereon.

The sockets 14 are vertically spaced to provide the cut section 16 thereof. A height dimension of the cut section 16 which is a clearance between spaced sockets 14 is small, and is the same dimension of a thickness of the support section 35. When the support bases 33 are engaged to the sockets 14, the support base 33 should be engaged in the socket 14 of the column 2F before assembling of the side frame 1L, 1R. The engagement section 34 of the support base 33 is inserted horizontally into the channel 15, consequently, a corner side the support section 35 is inserted horizontally into the cut section 16.

Elongated support bases 19, 25, 29 and 33, each of which runs the length between the front column 2F and 2F and between the rear column 2R and 2R, and is engaged to the sockets 14 which face each other.

If desired, modification of this construction, not shown in the drawings, can be accomplished wherein each of support bases 19, 25, 29 and 33 are engaged in the socket 14 at the location along left side frame 1L is in one step upward position with respect to the socket 14 at the location along right side frame 1R. The support base 19, 25, 29 and 33 are then arranged in like steps between the left and right side frame 1L, 1R.

If desired, but not shown in the drawings, each of the support bases 19, 25, 29 and 33 may be engaged in downwardly inclined relationship with respect to the sockets 14, 14 at the each of front and rear column 2F, 2R of both side frame 1L, 1R, which is adapted to be permitted for displaying the packages at an incline.

While the invention has been describe with regards to the preferred embodiment and a number of alterative embodiments, it is recognized that other embodiments of the present invention may be devised which would not depart from the scope of the present invention

What is claimed is:

1. A collapsible rack for slidably receiving traylike articles comprising:

a framework having pairs of vertical column spaceable in a lateral direction, the columns of each pair of columns being fixedly spaced in the fore-and-aft position, horizontal structural elements extending between the columns of each pair of columns spaced in said fore-and-aft direction, said laterally spaced pairs of columns defining therebetween a space open on at least a front side of the foldable rack when said rack is in an uncollapsed condition, a plurality of traylike articles positioned horizontally between said horizontal structural elements extending between a pair of columns spaced in said fore-and-aft direction and another pair of columns spaced in said fore-and-aft direction whereby to maintain said rack is an uncollapsed condition;

said columns being formed of relatively thin-walled tubular metal sheathed in a plastic resinous material, recessed flanges integral in said plastic resinous material of each column on the side of the resinous material adjacent said space extending toward the other column of the respective pairs columns spaced in said fore-and-aft direction, a plurality of parallel horizontally disposed guide means mounted in said recessed flanges between each of said pair of pre-and-aft spaced columns, said guide means being detailed to support said traylike articles, slidable mounting means positioned on each of said horizontal structural elements, a movable vertical column mounted to each of said slidable mounting means, a plurality of horizontal members, said plurality of horizontal members being connected between each of said one column of said pair of columns in an aft position and said vertical column, two of said horizontal members defining an x-like configuration, whereby said spaced vertical column may be selectively collapsed or uncollapsed.

2. The collapsible rack of claim 1 wherein the rack has a bracket, said bracket is horizontally disposed between said horizontal structural elements connecting each pair of columns spaced laterally.

* * * * *